June 2, 1959

W. KILCHENMANN 2,888,798

TWO-CYCLE INTERNAL COMBUSTION ENGINE WITH
EXHAUST GAS OPERATED TURBOCOMPRESSOR

Filed Dec. 12, 1955

INVENTOR.
WALTER KILCHENMANN.
BY
K. H. Mayr
ATTORNEY.

INVENTOR.
WALTER KILCHENMANN.
BY
ATTORNEY.

United States Patent Office 2,888,798
Patented June 2, 1959

2,888,798
TWO-CYCLE INTERNAL COMBUSTION ENGINE WITH EXHAUST GAS OPERATED TURBOCOMPRESSOR

Walter Kilchenmann, Winterthur, Switzerland, assignor to Sulzer Frères, S.A., Winterthur, Switzerland, a corporation of Switzerland Application December 12, 1955, Serial No. 552,624

Claims priority, application Switzerland December 17, 1954

9 Claims. (Cl. 60—13)

The present invention relates to a two-cycle internal combustion engine which may have one or more cylinders and in which the inlet ports are controlled by the working pistons of the engine, at least one separate air admission channel being provided for each cylinder, through which channel scavenging and charging air flows from a distributing conduit which is supplied from at least one exhaust gas operated turbocompressor. The air admission channels are individually provided with air accumulator chambers whose volume is periodically changed by a displacing piston at the same frequency as the working space of the respective engine cylinder is changed by the respective working piston as is disclosed in my copending application Ser. No. 552,569, filed December 12, 1955 of which the present application is a continuation in part.

A two-cycle cylinder is differentiated from a four-cycle cylinder by the inability of the former to automatically draw in air and regulate the volume thereof. The air must be provided by a turbocompressor which is driven by the exhaust gases of the engine whereby the pressure of the compressed air depends on the operating conditions of the turbocompressor. The two-cycle cylinder requires additional or excess air for scavenging so that more power must be produced by the the exhaust gas turbine than is required by a four-cycle cylinder operating at the same charging rate.

In order to avoid the difficulties caused by the aforedescribed circumstances, it has been proposed to operate the supercharger compressor by a force other than the exhaust gas, for example, to drive it by the internal combustion engine at a speed corresponding to the speed of the latter, or to arrange a piston pump in series or parallel relation with the exhaust gas driven turbocompressor whereby the piston pump is driven by the internal combustion engine or by a foreign source of power. However, these arrangements complicate the construction and the operation of the engine and increase operating losses.

In order to reduce the aforedescribed disadvantages an air accumulator chamber is provided on the air admission channels the volume of the accumulator chamber being periodically changed by means of an air displacing piston for temporarily accumulating air in the vicinity of the inlet ports.

The accumulator chamber is not necessarily a single chamber but may consist of a plurality of intercommunicating sub-chambers. The maain feature of the accumulator chamber is its lateral connection with the air admission channel, like a dead end street is connected with a throughway.

The arrangement of the accumulator chamber affords periodic preparation of a predetermined volume of air for the admission channel and for the inlet ports which air volume equalizes the difference between the air requirement of the working space of the cylinder and the air supplied by the distributor at a given moment. Such a difference exists, for example, when the engine is started and the turbocompressor is not yet operating. There is also an air deficiency during normal operation of the engine because the inlet ports are closed during the major part of the working cycle and the air needed for the working cycle must be supplied suddenly when the ports are open.

Because of the air displacement effected by the displacing piston the pressure of the air is increased shortly before the inlet ports are opened so that the outlet ports can be opened later relatively to the opening of the inlet ports.

In order to further improve the aforedescribed arrangement, particularly in order to facilitate starting of the two-cycle engine without resorting to a drive of the turbocompressor by means other than exhaust gas and in order to further improve the scavenging operation it is proposed to provide by-pass ports in the surface, on which the piston acting as displacing piston slides, and to connect the by-pass ports with the air distributing conduit by means of a by-pass conduit for rendering ineffective a portion of the stroke of the displacing piston by connecting the part of the accumulator chamber whose volume can be changed with the air distributing conduit and by-passing air around the admission channel.

The provision of the aforedescribed by-pass channel makes it possible to conform to the requirements of the scavenging operation the rocking movement of the air in the accumulator chamber and in the channel connecting the latter with the air admission channel as well as in the first part of the admission channel which part is between the distributor and the connection of the admission channel with the accumulator chamber and in the second part of the admission channel which second part extends from the connection of the air admission channel with the accumulator chamber to the inlet ports.

With the arrangement according to the invention the rocking movement of the air is not initiated at the beginning of the displacing stroke of the displacing piston but is initiated at a later moment which can be determined by the position of the by-pass ports, i.e., by the extent of the portion of the stroke of the displacing piston which is made ineffective. This is of particular advantage in installations where it is not possible to shift the operating phase of the displacing piston relatively to that of the working piston so that the displacing stroke of the former begins at a more suitable moment relative to the moment when the working piston opens the inlet ports, i.e., in installations in which the displacing piston is directly connected with the working piston or forms part of the latter.

With the arrangement according to the invention the duration of the displacing action of the displacing piston which normally lasts through a crank angle of 180° can be reduced and coordinated to the duration of the opening of the inlet ports which usually lasts only through a crank angle of 90° to 120°, by a suitable placement of the by-pass ports according to the invention.

By suitable construction of the by-pass channel the displacement of the air can be effected more or less suddenly and a pressure wave can be produced which increases the pressure increase upstream of the inlet ports so that the outlet of the working space of the engine cylinder can be opened still later relatively to the opening of the inlet ports.

The aforedescribed advantages benefit the operation of the engine while the turbocompressor does not supply enough air, as during starting and at slow speed operation of the engine. The arrangement according to the invention also benefits operating conditions at which the turbocompressor supplies enough air because the invention equalizes the air current in the first part of the air admission channel and because the effect of the expansion stroke of the working piston is improved by the aforedescribed pressure increase upstream of the inlet ports which affords a delayed opening of the outlet ports.

An intermediate air channel is preferably interposed between the air accumulator chamber and the air admission channel and a guide may be provided at the connection of the intermediate channel with the air admission channel which guide directs the air emerging from the intermediate channel towards the inlet ports.

The flow area of the first part of the admission channel which part extends between the distributor and the connection of the intermediate channel with the admission channel, may be made smaller than that of the second part of the admission channel which extends from the connection of the admission channel with the intermediate channel to and includes the inlet ports. This can be done because the flow of the air through the first part of the admission channel is made uniform by the arrangement according to the invention.

Means in the form of a one way choke or a check valve may be inserted in the first part of the admission channel for facilitating air flow from the distributor to the engine cylinder and obstructing air flow in the opposite direction.

The aforedescribed three provisions reduce backflow and congestion in the first part of the admission channel and increase the flow of scavenging air in the second part of the admission channel.

The accumulator chamber may consist of a plurality of connected sub-chambers whereby the volume of at least one sub-chamber is periodically changed, the volume of the other sub-chambers being constant. This facilitates placement of a relatively large accumulator chamber volume in the engine and control of the rocking movement of the air in favor of the requirements of the scavenging operation, particularly at variable engine speeds.

In a single-acting two-cycle engine the accumulator chamber may communicate with the space in the engine cylinder below the working piston and the bottom side of the working piston may serve for displacing the air in the accumulator chamber. The space above the working piston is the working space of the cylinder. In this case an intermediate wall is provided in the working cylinder for separating the space below the piston from the crankcase, the piston rod of the working piston extending through the intermediate wall and being gastight sealed thereagainst. This arrangement is particularly simple and is made particularly useful by the provision of the intermediate channel interposed between the accumulator chamber and the air admission channel.

By providing an intermediate channel between the accumulator chamber and the air admission channel, inter alia, the time period between the creation of a pressure wave on the by-pass ports and the arrival of the pressure wave at the inlet ports is increased so that the portion of the displacement stroke which is rendered inactive by the by-pass conduit can be reduced in favor of the active part of the displacement stroke of the air displacing piston.

Air inlet ports may be provided in addition to the inlet ports which are supplied by the air admission channel, the additional inlet ports receiving air from the turbocompressor which air is by-passed around the air inlet channel. The first part of the latter is thereby relieved, only a portion of the total needed air flowing through the first part of the air admission channel, so that the flow area of this first part can be further reduced in favor of the scavenging air flow through the second part of the air admission channel.

If the bottom side of the working piston is used as air displacing piston, the additional air inlet port and the by-passing port can be connected with the by-passing channel.

For controlling the exhaust of the engine an element independent of the working piston, which controls the inlet ports, may be provided at least in addition to exhaust ports preliminarily controlled by the engine piston, for controlling the outlet of the working space of the engine cylinder. In this case the length of the working piston may be made so small that the additional port coincides with the by-pass port. This results in a particularly simple and effective execution of the invention.

The novel features which are considered characteristic of the invention are set forth with particularity in the appended claims. The invention itself however and additional objects and advantages thereof will best be understood from the following description of embodiments thereof when read on connection with the accompanying drawing, in which:

Fig. 4 is a sectional view of an air flow restricting means suitable for use in the implementation of the invention;

The same numerals designate the same parts in all figures.

Figure 1:
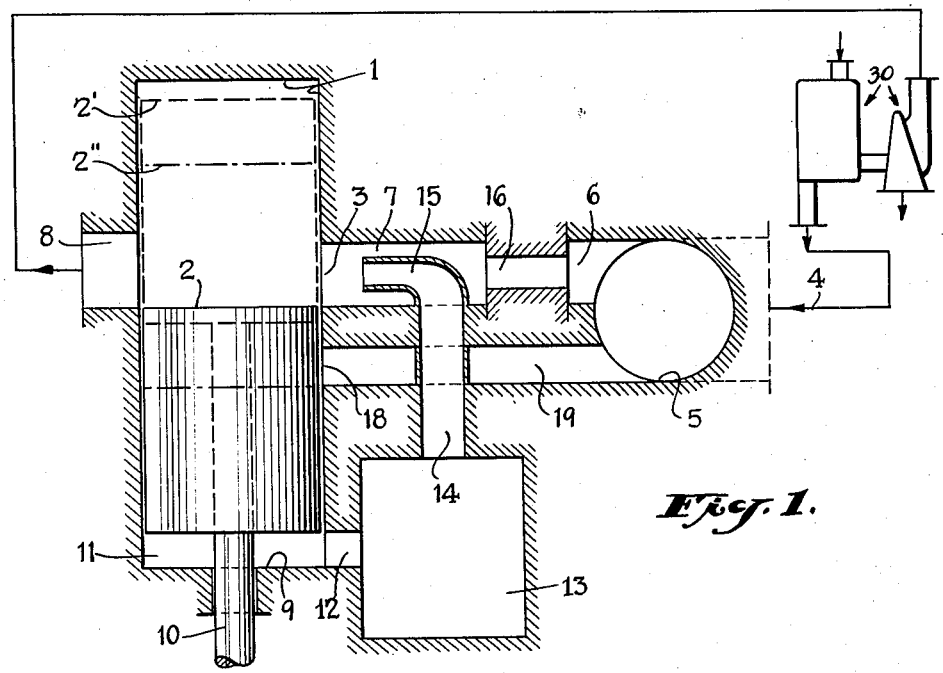
Fig. 1 is a diagrammatic longitudinal sectional view of a cylinder of a multicylinder two-cycle internal combustion engine equipped according to the invention.
Figure 2:
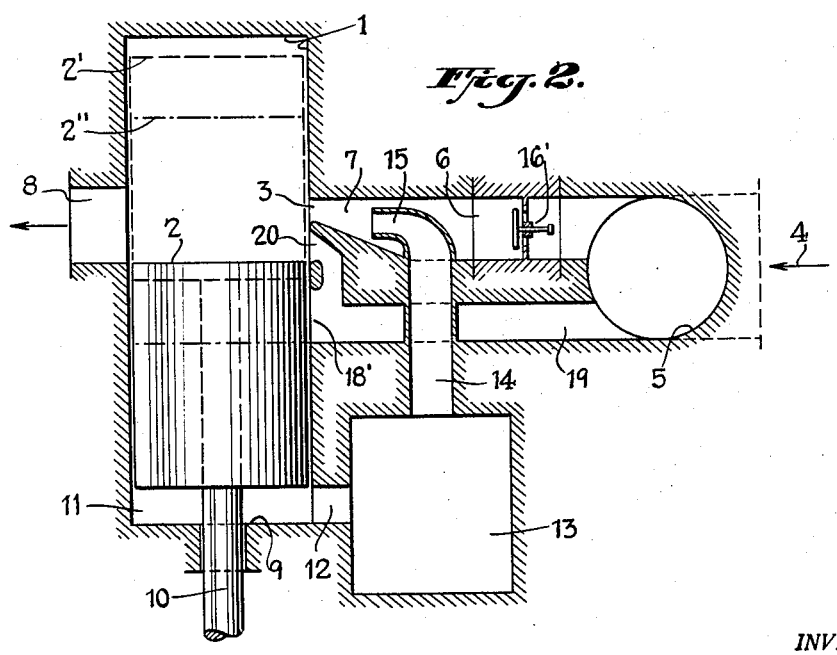
Fig. 2 is a diagrammatic longitudinal sectional view of a cylinder of a multicylinder two-cycle internal combustion engine equipped in a modified manner according to the invention.
Figure 3:
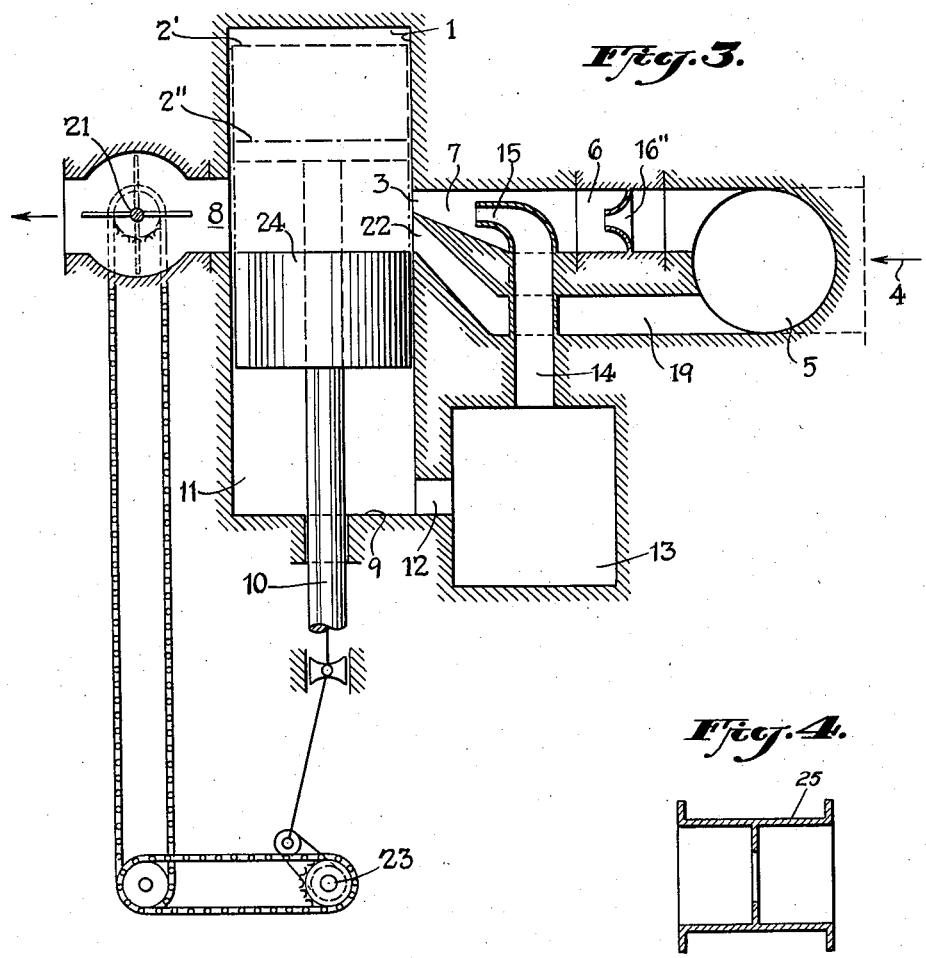
Fig. 3 is a diagrammatic longitudinal sectional view of a cylinder of a further modification of a multicylinder two-cycle internal combustion engine.

Referring more particularly to the drawing, Figures 1 to 3 illustrate embodiments of the invention in which the bottom side of the working piston of the engine serves as air displacing piston. Numeral 1 in Figs. 1 to 3 designates one of the cylinders of a multicylinder two-cycle internal combustion engine, a piston 2 (24 in Fig. 3) being shown in solid lines in its lower dead center position, the upper dead center position 2' being illustrated by means of dotted lines. The cylinders are provided with air inlet ports 3 to which scavenging and charging air is supplied by a turbocompressor 30 connected to and operated by exhaust gas from the cylinder or cylinders 1. The air from the turbocompressor enters a distributing conduit 5 as indicated by an arrow 4, one distributing conduit being common to a plurality of engine cylinders. A separate air admission channel 6, 7 for each cylinder connects the distributing conduit 5 with the respective inlet port 3.

The engines shown in Figs. 1 and 2 have exhaust ports 8 controlled by the piston 2.

In the engine shown in Fig. 3 an exhaust control element 21 which is independent of the working piston of the engine is provided in addition to the exhaust port 8, the latter, which is opened and closed by the working piston, acting as a preliminary control.

The gas exhausting from the engines is conducted by conventional means to the turbocompressor 30, shown only in Fig. 1.

The cylinder 1 is separated from the crankcase of the engine, not shown, by an intermediate wall 9 through which a piston rod 10 extends. A gas-tight seal is provided at the passage of the piston rod through the intermediate wall.

Figure 5:
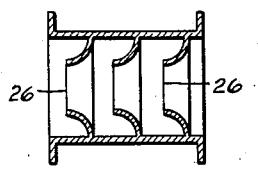
Figs. 5 to 7 are sectional views of backflow throttles which are suitable for use in engines equipped according to the invention.
Figure 6:
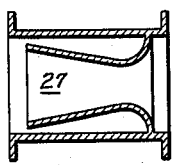
Figure 7:
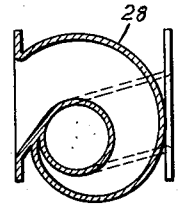

Each cylinder is provided with an accumulator chamber composed of a first sub-chamber 11 which includes the cylinder space below the working piston and whose volume is periodically changed by the latter, and a second sub-chamber 13 which communicates with the first sub-chamber 11 through a channel 12. The chamber 13 is laterally connected by means of an intermediate channel 14 and a guide connection 15 with an air admission channel which comprises a first portion 6 extending from the distributing conduit 5 to the connection 15 and a second portion 7 extending from the connection 15 to the inlet port 3. The connection 15 is so shaped as to guide the air into the channel portion 7 in a direction towards the inlet port 3. In the first portion 6 of the air admission channel a flow restricting means is placed for impeding flow of air back towards the distributing conduit 5. In the modification shown in Fig. 1 the flow restricting means consists of a channel portion 16 of relatively small flow area. In the modification shown in Fig. 2 a check valve 16' is provided. In the modification shown in Fig. 3 a one way choke 16" is used. The flow restriction may be in the form of an orifice plate 25 as shown in Fig. 4. The backflow throttle may be composed of a plurality of nozzles 26 as shown in Fig. 5, or in the form of a venturi tube 27 as shown in Fig. 6, or in the form of a spiral 28 as shown in Fig. 7. The use of the flow restricting means and one way chokes is not limited to the combinations shown in Figs. 1 to 3. One way chokes may be used in the engine shown in Fig. 1 and flow restricting means in the engine according to Fig. 3. The check valve shown in Fig. 2 may be replaced, if desired, by flow restricting means or by a one way choke.

Fig. 1 shows a by-pass port 18 which is directly connected by means of a by-pass channel 19 with the distributing conduit 5. The by-pass port 18 and the channel 19 renders the upper portion of the stroke of the working piston between the positions 2' and 2" ineffective for displacing air in the sub-chamber 11. When the bottom side of the piston 2 has passed below the by-pass port 18, so that the port 18 is closed, the bottom side of the piston begins to act as displacing piston.

The engine shown in Fig. 2 is provided with an additional inlet port 20 which communicates with a by-pass port 18', both ports communicating with a by-pass conduit 19 connected with the distributing conduit 5. In this manner the suction action of the piston 2 on the accumulator chamber 13 is reduced or rendered ineffective during the upper part of the piston stroke because air from the compressor can pass through the conduits 5 and 19 and the lower space 11 of the cylinder into the chamber 13.

In the engine shown in Fig. 3 a valve 21 controlling the exhaust of the engine is provided in addition to the exhaust port 8. The valve 21 is driven by the crankshaft 23 of the engine by means of a chain drive or other suitable means for coordinating actuation of said valve to the operation of the engine. In this case the piston 24 can be made so short that a single row of additional inlet ports 22 is sufficient in contradistinction to the modification shown in Fig. 2 in which the piston 2 is so long that two rows of additional ports 20 and 18' must be provided.

What is claimed is:

1. A two-cycle internal combustion engine plant comprising a plurality of working cylinders, a piston reciprocable in each cylinder and forming a working space in said cylinder above the piston, air inlet ports in the working space part of each cylinder and controlled by the respective piston, a turbocompressor connected with said cylinders for receiving operating gas therefrom, an air distributing conduit connected with said turbocompressor for receiving air therefrom, an air admission channel connected with each of said cylinders and communicating through the respective air inlet ports with the respective cylinder, said channels being connected with said conduit for supplying precompressed scavenging and combustion air to said air inlet ports, each of said cylinders forming a closed chamber below the respective piston, an air chamber laterally connected with each of said air admission channels for air flow to and from said air admission channels, said air chambers individually communicating with the chambers in the respective cylinders below the respective pistons and forming individual variable volume air accumulators with the chambers below the pistons, by-pass air ports in each cylinder below the respective air inlet ports and controlled by the underside of the respective piston, and by-pass conduit means connecting the by-pass air ports of each cylinder with said air distributing conduit for individually connecting the spaces below said pistons with said conduit and returning air displaced by said pistons during the upper part of the down-stroke, during which part of the down-stroke said by-pass ports are uncovered, through said by-pass conduit means into said air distributing conduit.

2. A two-cycle internal combustion engine plant as defined in claim 1, in which the flow area of the part of said air admission channels upstream of the connections of said admission channels with said air chambers is smaller than the flow area of the part of said air admission channels between said inlet ports and the connections of said admission channels with said air chambers.

3. A two-cycle internal combustion engine plant as defined in claim 1, in which means are provided in the part of said air admission channels upstream of the connections of said admission channels with said air chambers for impeding the flow of air from said connections back into said distributing channel.

4. A two-cycle internal combustion engine plant according to claim 3 in which said means in said air admission channels are in the form of a one way choke.

5. A two-cycle internal combustion engine plant according to claim 3 in which said means in said air admission channels are in the form of a check valve.

6. A two-cycle internal combustion engine plant as defined in claim 1, including intermediate channels individually interposed between said air chambers and said air admission channels.

7. A two-cycle internal combustion engine plant as defined in claim 1, including guide means placed in said air admission channels at the connections of said air chambers with said admission channels for directing the air emerging from said air chambers towards said inlet ports.

8. A two-cycle internal combustion engine plant as defined in claim 1 including an additional air inlet port in said cylinders, said additional inlet ports being connected with the respective by-pass channels for receiving air therefrom and being controlled by the top side of said working pistons.

9. A two-cycle internal combustion engine plant according to claim 1 including an exhaust port in each of said cylinders, said exhaust ports being substantially on the same level as said by-pass ports, additional exhaust control elements individually placed downstream of said exhaust ports, and means connected with and coordinating actuation of said control elements to the operation of the engine and stopping exhaust through said exhaust ports when said pistons are in the upper dead center position, said by-pass ports being adjacent to said air inlet ports and being controlled by both sides of said pistons to act as additional air inlet ports when said working pistons are below the by-pass ports.

References Cited in the file of this patent
UNITED STATES PATENTS

| | | |
|---|---|---|
| 813,746 | Shanck | Feb. 27, 1906 |
| 1,310,672 | Sherbondy | July 22, 1919 |
| 1,785,909 | McKinney | Dec. 23, 1930 |
| 2,082,780 | Buchi | June 8, 1937 |
| 2,348,518 | Birkigt | May 9, 1944 |

FOREIGN PATENTS

| | | |
|---|---|---|
| 132,397 | Great Britain | Sept. 18, 1919 |